United States Patent
Leister et al.

(10) Patent No.: US 8,358,454 B2
(45) Date of Patent: Jan. 22, 2013

(54) HOLOGRAPHIC DISPLAY HAVING IMPROVED RECONSTRUCTION QUALITY

(75) Inventors: Norbert Leister, Dresden (DE); Grigory Lazarev, Berlin (DE); Gerald Futterer, Dresden (DE)

(73) Assignee: SeeReal Technologies S.A., Munsbach (LU)

( * ) Notice: Subject to any disclaimer, the term of this patent is extended or adjusted under 35 U.S.C. 154(b) by 407 days.

(21) Appl. No.: 12/678,326

(22) PCT Filed: Sep. 15, 2008

(86) PCT No.: PCT/EP2008/062220
§ 371 (c)(1),
(2), (4) Date: Mar. 16, 2010

(87) PCT Pub. No.: WO2009/037219
PCT Pub. Date: Mar. 26, 2009

(65) Prior Publication Data
US 2010/0194745 A1    Aug. 5, 2010

(30) Foreign Application Priority Data
Sep. 17, 2007    (DE) .......................... 10 2007 045 332

(51) Int. Cl.
*G02B 5/32*    (2006.01)
*G03H 1/28*    (2006.01)

(52) U.S. Cl. ............................................ 359/21; 359/24

(58) Field of Classification Search .................... 359/21, 359/24
See application file for complete search history.

(56) References Cited

U.S. PATENT DOCUMENTS
6,268,941 B1    7/2001    Halldorsson
2006/0055994 A1    3/2006    Schwerdtner
2006/0250671 A1    11/2006    Schwerdtner et al.

FOREIGN PATENT DOCUMENTS
DE    195 41 071    5/1997
DE    197 04 741    8/1998
DE    101 37 832    12/2002
DE    102004063838    7/2006
(Continued)

OTHER PUBLICATIONS
International Search Report, dated Feb. 17, 2009, and Written Opinion issued in priority International Application No. PCT/EP2008/062220.
(Continued)

*Primary Examiner* — Jade R Chwasz
(74) *Attorney, Agent, or Firm* — Saul Ewing LLP

(57) ABSTRACT

Disclosed is a display for the holographic reconstruction of a three-dimensional scene using means which allow a reduction of speckle patterns. Speckle patterns result in the graining of a holographic reconstruction and worsen the quality thereof. The 3D scene is incoherently superimposed with itself chronologically or spatially in the eye of the observer. The modulated wave fronts of each reconstructed object point of the scene are shifted relative to themselves in the reconstruction beam path and superimposed in the eye of the observer. The shifting may occur one-dimensionally and two-dimensionally. Each object point is multiplied with itself in the eye of the observer in accordance with the number of the shifted wave fronts. The various speckle patterns over which the eye of the observer averages are also multiplied. Speckle patterns are reduced and the reconstruction quality is thus increased in holographic displays.

18 Claims, 4 Drawing Sheets

FOREIGN PATENT DOCUMENTS

| | | |
|---|---|---|
| DE | 102006062377 | 6/2008 |
| DE | 102007023738 | 1/2009 |
| EP | 1 563 346 | 5/2004 |
| WO | WO 2004/044659 | 5/2004 |

OTHER PUBLICATIONS

International Preliminary Report on Patentability, dated Jan. 21, 2010, issued in priority International Application No. PCT/EP2008/062220.

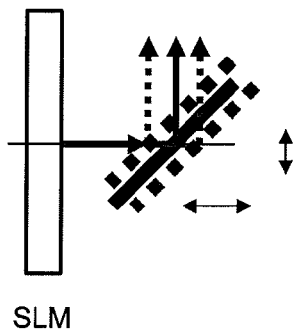
SLM
Fig. 3a
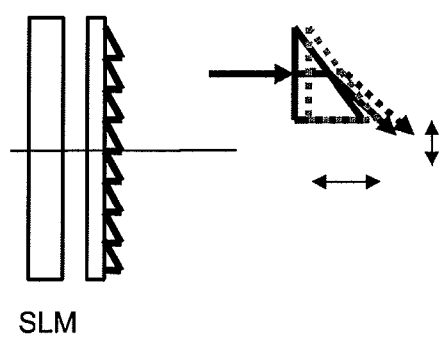
SLM
Fig. 3b
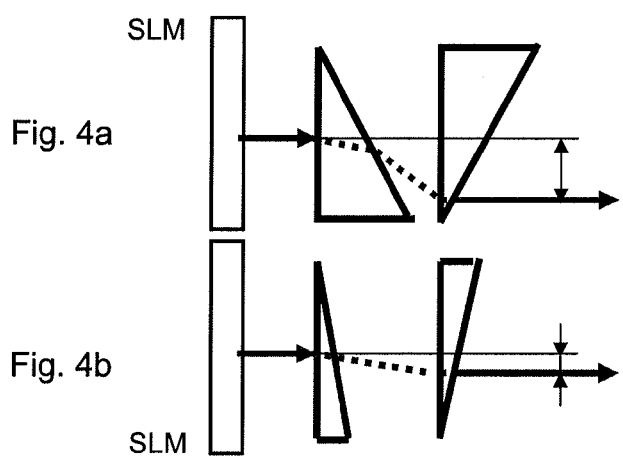
Fig. 4a
Fig. 4b
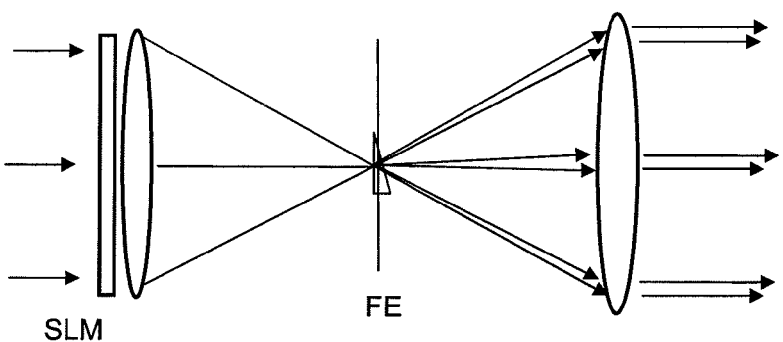
SLM                 FE
Fig. 5

HOLOGRAPHIC DISPLAY HAVING IMPROVED RECONSTRUCTION QUALITY

CROSS REFERENCE TO RELATED APPLICATIONS

This application claims the priority of PCT/EP2008/062220, filed on Sep. 15, 2008, which claims priority to German Application No. 10 2007 045332.0, filed Sep. 17, 2007, the entire contents of which are hereby incorporated in total by reference.

BACKGROUND OF THE INVENTION

The present invention relates to a display device for holographically reconstructing a three-dimensional scene, said display device having an improved reconstruction quality thanks to the reduction of speckle patterns.

This invention can for example be applied in holographic display devices which are used to generate, store and reconstruct holograms of the three-dimensional scene in real-time or near-real-time processes with the help of coherent laser light. The reconstruction of the scene in such a display device is visible through a visibility region, which is also referred to as observer window, in a reconstruction space.

The method for reconstructing a scene, where the reconstruction is visible through an observer window, and examples for the computation and encoding of the hologram of the scene have been described in earlier documents filed by the applicant, for example in (1) EP 1 563 346 A2 and (2) DE 10 2004 063 838 A1.

Further, those documents describe a holographic display device in which the above-mentioned method for the reconstruction of a hologram is implemented. The reconstruction method will be briefly explained below:

For the holographic reconstruction, a three-dimensional scene is sliced by software means into section layers, each of which comprising a multitude of object points of that scene. The object points characterise both the section layer and, as the sum of all layers, the three-dimensional scene.

A computer-generated hologram (CGH) is computed based on the object points as a two-dimensional arrangement of generally complex values, which are represented on a light modulator means. The light modulator means comprises regularly arranged, controllable elements for the modulation of the wave fronts of the incident coherent light with the complex values of the encoded scene. The reconstruction of the scene is generated in a reconstruction space with the help of the coherent light and a reconstruction means, which is controlled by system controller means. The wave fronts of the reconstructed object points are coherently superimposed in the observer window. An observer sees from an eye position in that observer window the resultant reconstruction of the scene in the reconstruction space, which stretches between the observer window and a modulator means or screen.

According to a modified version of this method, a reconstruction of the scene can also be generated by computing individual CGHs from the individual object points, and by encoding separate regions on the light modulator means with those sub-holograms. The phase distribution of the complex values in the region of the sub-hologram roughly corresponds with a holographically encoded lens function, which reconstructs that single object point in its focal point. The focal length of such a lens depends on the axial distance of the object point from the light modulator means or screen.

The absolute value of the complex values, i.e. the amplitude, is about constant across the entire sub-hologram, and its magnitude depends on the axial distance of the object point from the screen or light modulator means, and on the brightness of the object point. As coherent light passes through the light modulator means, the complex transparency values which are encoded there modify the amplitude and/or phase of the light. The object point is reconstructed by the modulated light. Outside the sub-hologram, this object point has the value zero on the light modulator means, i.e. it is only represented by the sub-hologram. The total encoded hologram of the scene is generated by adding the complex values of the individual sub-holograms.

According to a simplified version of the method, object points are for example combined according to certain criteria so to form object point groups, where each group is represented by one CGH in a sequential process. Their wave fronts are in that case superimposed incoherently in the observer window and generate a resultant reconstruction of the scene in the reconstruction space.

This is described with several computation and representation options in hitherto unpublished documents filed by the applicant, e.g. in DE 10 2006 062 377 and DE 10 2007 023 738.

For watching the reconstruction of the three-dimensional scene, the observer can either look at a light modulator means on which a hologram of the scene is directly encoded, and which serves as a screen. This is referred to as a direct-view arrangement. Alternatively, the observer can look at a screen onto which an image of the hologram values encoded on the light modulator means is projected. This is referred to as a projector arrangement.

The eye positions of observers are detected by a position finder in a known manner, said position finder being linked by software means with a storage means and a computing unit, and with a system controller means. The storage means also hosts the information of the object points which are necessary for computing the CGH in data records in the form of a look-up table.

The size of the observer window in front of a display means is defined; it is typically as large as an eye pupil. Seen from the wave-optical point of view, an observer window is formed either by a direct or inverse Fourier transform or Fresnel transform of a hologram encoded on a light modulator means, or by the image of a wave front encoded on a light modulator means in a plane of a reconstruction space. The observer window only comprises a single diffraction order of a periodic reconstruction of the scene. The plane may be a focal plane of a focussing means, or the image plane of a light source. The hologram or the wave front are computed from the scene such that, within the one diffraction order which serves as the visibility region, cross-talking between the observer eyes is prevented, which would typically occur in reconstructions when using light modulators. In conjunction with an arrangement or a method for suppressing higher diffraction orders, scenes can be consecutively presented in a multiplex process to a left and to a right eye of an observer without any cross-talking. Moreover, a multiplex process with the aim to serve multiple persons only then becomes possible.

The pixels of spatial light modulators, such as LCD, LCoS etc., which modulate the phase and/or amplitude of incident light, serve to represent the holograms and to generate the complex-valued wave fronts of the scene. The refresh rate of the light modulator means must be sufficiently high in order to be able to represent a moving scene.

Because of the coherence of lasers, disturbing patterns, which are also known as speckle patterns or granulation, occur in the observer plane when using laser light for illuminating a light modulator. Speckle can be described as a granulation-like interference pattern which is created by interference of multiple light waves with statistically irregularly distributed phase differences. It disturbs the observer in watching the reconstruction of the scene, and it causes spatial noise there.

Speckle patterns can generally be reduced by temporal and/or spatial averaging of reconstructions of the scene in the observer eye. The observer eye always averages out multiple reconstructions with different speckle patterns presented to it, which results in a smoothing of the contours of the reconstructed scene.

According to document DE 195 41 071 A1, for example, a rotating glass plate is put into the optical path in order to temporally average the granulation or speckle patterns when checking the authenticity of a hologram. It rotates at a frequency which matches the frequency of a detector used for recording. Speckle patterns do thus not occur as disturbing effects.

However, such a method can only be applied for reducing two-dimensional, plane speckle patterns, where the diffusing plate must be disposed in the plane of the speckle patterns. The disadvantage of this method is that too much light is lost because of a diffusing plate in the light path. Further, it shall be avoided to use a mechanically rotating component in designing a holographic display device.

Another known method of reducing speckle patterns is to compute the scene with a given number of different random phases, and to represent the resultant holograms on a light modulator means one after another at a fast pace. However, the computational load increases substantially because of the many hologram computations. Further, a light modulator means provided to represent the holograms must have a very fast refresh rate.

SUMMARY OF THE INVENTION

It is the object of the present invention to realise methods based on averaging processes for reducing speckle patterns in a holographic display device with an observer window using simple means and without much effort. Light source means which generate coherent light and commercially available light modulator means shall be used in doing so. It is not necessarily required to use fast-switching light modulator means.

The present invention for reducing speckle patterns takes advantage of methods which are based on averaging multiple reconstructions of the three-dimensional scene by observer eyes, which have already been described by the applicant. The methods are based on the fact that a three-dimensional scene is composed of individual objects, and these on individual object points, whose speckle-pattern-affected reconstructions are superimposed in the observer eye. This was described in detail in the prior art section above.

Based on those methods, the object is solved according to this invention in that means for temporally or spatially displacing the modulated wave fronts of the object points are provided in the reconstruction beam path of a holographic display device, said means serving to multiply the reconstruction of each object point and to incoherently superimpose the displaced modulated wave fronts in the eye of at least one observer. An observer eye thus perceives a resultant reconstruction with reduced speckle pattern.

According to a preferred embodiment of the invention, the multiplication of the reconstruction of each object point is performed at least twice, in two perpendicular directions.

The following means for displacement and superimposition according to this invention are generally independent devices; however, they can also be combined partly in order to solve the object. According to this invention, they can displace and superimpose the reconstructed object points with themselves spatially or sequentially.

In embodiments of the invention, the following ways of displacing modulated wave fronts or reconstructed object points are possible in the reconstruction beam path of the holographic display device:

In a first embodiment of the invention, a mirror is provided which is disposed at a given angle to the optical axis of the light modulator means, and which can be moved both laterally and along the optical axis.

In another physical form of the first embodiment, a prism matrix is provided in a plane which is parallel to the plane of the light modulator means, where said prism matrix can be moved both along the optical axis of the light modulator means and in lateral direction.

In a second embodiment of the invention, a variably controllable prism pair is provided in a plane which is parallel to the light modulator means, where the angles of refraction of the prisms sequentially vary between at least two values at a high switching frequency. The modulated wave front of each object point can thus be directed at an observer eye while being displaced against itself at least once, i.e. with a lateral offset, and then be superimposed in the observer eye. In another physical form of the second embodiment, controllable prism pairs are provided in a regular arrangement in a matrix for displacing the modulated wave fronts, where the angle of refraction of the prisms sequentially varies between at least two values at a very high switching frequency.

In a third embodiment of the invention, the display is a holographic projection display, where a variably controllable prism is disposed centrally in a Fourier plane, which is at the same time the front focal plane of an optical reconstruction system.

In a fourth embodiment of the invention, a matrix of rhombic prisms is provided next to the light modulator means in combination with a polarisation switch. In another physical form, a combination of two matrices of rhombic prisms and two polarisation switches is disposed next to the light modulator means for a two-dimensional displacement of the modulated wave fronts.

In a fifth embodiment of the invention, the light modulator means is followed by a first optical component made of a birefringent material in combination with a polarisation switch, after which a second optical component made of a birefringent material is disposed. The birefringent material is preferably of a two-part design.

The polarisation switch can be an active means in the form of a Faraday cell, or a passive means in the form of a $\lambda/2$ plate.

In a sixth embodiment of the invention, a combination of two Bragg gratings with spacer in between for lateral one-dimensional displacement of the modulated wave fronts parallel to the original direction of propagation is provided in the reconstruction beam path.

In another physical form, the modulated wave front of an object point undergoes a sequential, two-dimensional displacement by combining the Bragg gratings with the spacer and an additional 90° polarisation switch.

In a further physical form, the Bragg gratings are combined with a 45° polariser in order to divide the modulated wave front of each reconstructed object point in two perpendicular components and to displace them one-dimensionally against one another simultaneously.

In a further physical form, each modulated wave front undergoes a two-dimensional displacement in that at least one Bragg grating is written to a volume hologram for one direction and at least one Bragg grating is written to a volume hologram for another direction.

In a further physical form, two volume holograms with Bragg gratings written to them are arranged in relation to each other such that for each two-dimensionally multiplied object point a resultant pattern is generated in that always two adjacent object points are superimposed such that they exhibit perpendicular polarisations p and s, so that they can be reconstructed incoherently to each other.

In doing so, at least one Bragg grating is required for the multiplication of the object points in one direction.

In a seventh embodiment of the invention, the combination of the two Bragg gratings with spacer is provided for each colour, in order to achieve a colour reconstruction of the scene with the three primary colours RGB. In a physical form of this embodiment, the combination of the Bragg gratings with the spacer is written to a volume hologram such that the volume hologram includes always two Bragg gratings per direction and per colour, in order to achieve a colour reconstruction of the scene with the three primary colours RGB.

BRIEF DESCRIPTION OF THE DRAWINGS

The present invention will be described in detail below with the help of several embodiments, where the FIGS. 2 to 8 are top views, wherein:

FIGS. 3a, 3b show a first embodiment for displacing the modulated wave fronts a) with a movable mirror, and b) with a movable prism;

FIGS. 4a, 4b show a second embodiment for displacing the modulated wave fronts with a variably controllable prism pair;

FIG. 5 shows a third embodiment with a controllable prism which is disposed in a Fourier plane;

DETAILED DESCRIPTION

Holographic display devices according to this invention can be realised in the form of direct-view displays or projection displays.

The invention for reducing speckle patterns is based on the general idea that the reconstructed scene is incoherently superimposed with itself. As the scene is composed of a multitude of object points, all reconstructed object points must thus be superimposed with themselves. For this, all reconstructed object points, and thus their diffraction images, are first multiplied by displacing their modulated wave fronts in a time or space division multiplex process, and then incoherently superimposed in the observer eye, without changing the image content of the scene.

Each reconstructed object point has a distinct speckle pattern. The larger the number of superimpositions, the finer are the individual speckle patterns averaged by the observer eye, and thus the more significant is the perceivable reduction. The physical and software means necessary for the reconstruction of the scene are part of system controller means (not shown), or work together with the latter.

Figure 1:
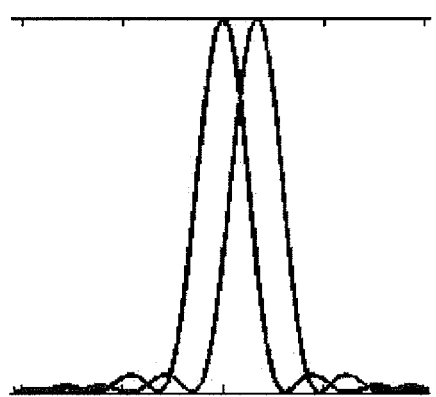
FIG. 1 is a graphic representation of the superimposition of two diffraction images of a single object point on the retina of the eye.

FIG. 1 is a graphic representation of the result of a displacement of a reconstructed object point with the maxima and minima of the two diffraction images. The two diffraction images are incoherently superimposed, and their maxima exhibit a certain offset, so that a speckle pattern is visibly smoothed.

The statistical character of the speckle patterns is determined by the correlation length $\delta_{SP}$, which defines the size of the speckle pattern. For a certain section layer of the scene in the reconstruction space, it only depends on the diameter of the eye pupil Dp of the observer and on the wavelength $\lambda$ of the light emitted by a laser which serves as the light source means.

It can be determined with the aid of the following equation (1):

$$\delta_{SP} \approx 2.4\lambda \frac{S}{D_P} \tag{1}$$

where $D_P$ is the diameter of the eye pupil, $\lambda$ is the wavelength and S'=f'+z' is the image width in the section layer with the images of the object points OP1, OP2 on the retina of the eye.

If, when a reconstructed object point OP is multiplied, the distance between its multiplied images OP' on the retina is at least as large as the correlation length $\delta_{SP}$, the standard deviation of the speckle patterns of the reconstructed object points OPn will be reduced by a factor of $\sqrt{2}$. In the case of a two-dimensional displacement of all object points OPn, the standard deviation of the speckle patterns will be halved.

Figure 2:
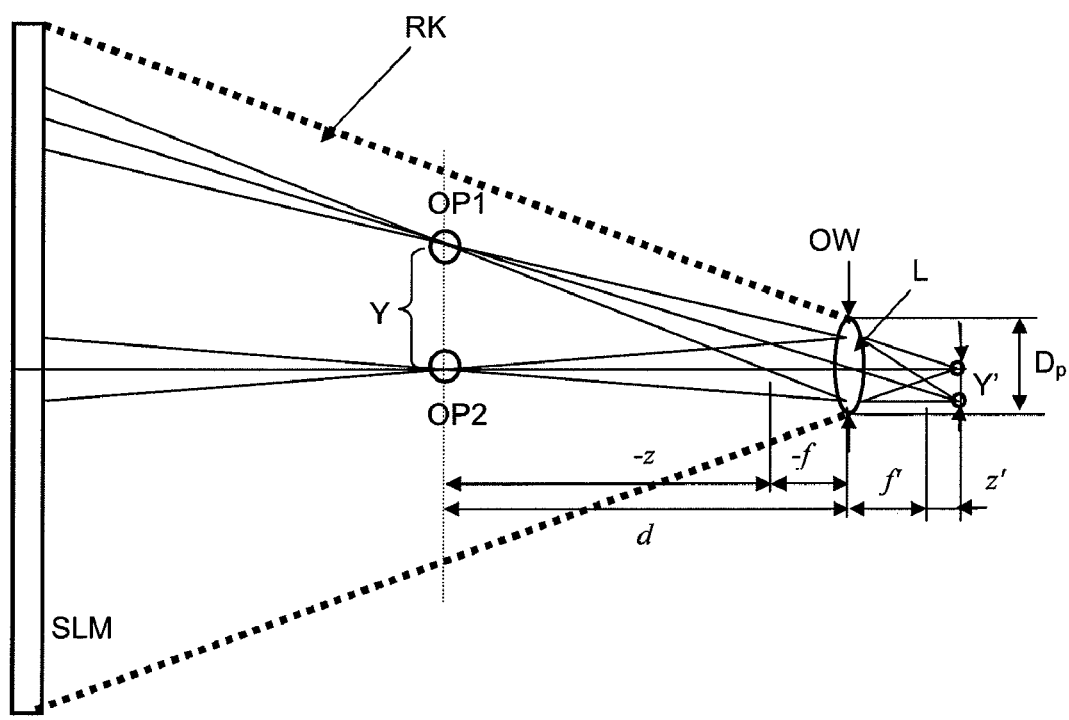
FIG. 2 is a schematic diagram which shows two reconstructed object points in the reconstruction space, and which introduces parameters for determining the size of a speckle pattern.

FIG. 2 shows the geometrical and optical relations in order to illustrate the connections.

The letter Y denotes the lateral distance in the object plane between the object points OP1 and OP2 in the reconstruction space RK, and the letter Y' denotes the distance between the images of those object points in the image plane. The reconstruction space RK stretches from a light modulator means SLM to the eye lens L; and the object points OP1 and OP2 are situated at a distance d from that eye lens L. The diameter of the eye lens L here forms the observer window OW at the same time.

The distances Y and Y' are related as specified in equation (2):

$$Y = \frac{Y'}{\beta} \tag{2}$$

where $\beta$ is the reproduction scale, which is given in equation (3):

$$\beta = -f/z = -z'/f' \tag{3}$$

where f is the focal length, z is the object width, and f' and z' are the corresponding parameters on the image side.

It can be derived from these equations that the visible size of the speckle patterns becomes the smaller the smaller the distance between the observer and the reconstructed scene. Since in the reconstruction space RK all section layers have the same number of matrix dots, where object points OPn can be situated, the distance between the individual object points OPn changes in proportion with the distance of the observer eye. This means that the visible speckle pattern also changes in proportion with the distance of the observer eye. The speckle patterns in each section layer are thus perceived by the observer eye in the same size.

Based on that thought, FIGS. 3 to 9 show schematically possible physical means for displacing and thus for multiplying and superimposing the reconstructed object points of the scene, which is necessary for reducing speckle patterns by way of averaging according to this invention.

Lasers are used as light source means, and these lasers illuminate the light modulator means with coherent light. The individual components are controlled by system controller means (not shown).

In order to keep the drawings simple and comprehensible, they only show the displacement of the wave front of one object point, which is representative of all reconstructed object points OPn of the scene. The wave front is shown in the form of an arrow, which indicates the direction of displacement. Where like reference numerals are used, they denote components which generally have like functions, unless otherwise explained.

FIGS. 3a and 3b show two arrangements for mechanically displacing the modulated wave fronts of reconstructed object points according to a first embodiment of the invention.

Referring to FIG. 3a, a mirror is disposed at a fix angle of preferably 45° to the optical axis of the light modulator means SLM. It deflects all modulated wave fronts laterally by 90° to the original direction of propagation. The mirror, and thus also the wave fronts, can be displaced either one-dimensionally (laterally or along the optical axis of the light modulator means SLM), or two-dimensionally, i.e. in two perpendicular directions. This is indicated in the drawing by the double arrows and by the broken lines which represent the beam path after reflection from the mirror. Two other possible positions of the mirror are indicated by thick square points.

However, the mirror can also be disposed at any other angle to the light modulator means SLM, depending on the eye position of the observer, or on other components of the holographic display device.

Referring to FIG. 3b, there is a matrix of prisms disposed in a plane parallel to the plane of the light modulator means SLM. The prism matrix can be displaced both one-dimensionally and two-dimensionally, as indicated by vertical and horizontal double arrows. A displacement of the prism matrix along the optical axis is shown in detail using the example of a single prism. A displaced position of the prism, and thus of the wave front, is indicated by broken lines. The wave front is deflected towards an observer eye (not shown) at an offset to the original direction of propagation. The individual prisms are arranged in a regular pattern such that the prism wedges of all prisms in each row face the same direction.

Another physical form is possible here, that is a combination of the mirror (of FIG. 3a) and prism matrix, in order to realise a displacement. The prism matrix is for example attached to the mirror so that they form a compact optical unit.

The wave front of each reconstructed object point of the scene is sequentially displaced and superimposed with itself by the arrangements shown in FIGS. 3a and 3b. A double (one-dimensional) or quadruple (two-dimensional) number of respective reconstructed object points is generated and superimposed on the retina of the eye. It is also possible to generate a larger number of displacements, if the wave fronts of the reconstructed object points in one or in both directions are displaced not just once, but several times. The multiple displacement is indicated in FIG. 3a by multiple arrows which point towards the observer eye.

Referring to FIGS. 4a and 4b, a second embodiment describes an optically effected displacement of the modulated wave fronts.

A variably controllable prism pair is disposed in a plane which is oriented parallel to the light modulator means SLM, and a modulated wave front of a reconstructed object point hits this prism pair. The direction of propagation is indicated by arrows. The wave front is refracted during its passage through the prisms, so that it is parallel translated to the original direction of propagation. The angle of refraction of the two prisms is switched sequentially at a high switching frequency between two values, namely between a value according to FIG. 4a and a value according to FIG. 4b. The displacement here effects a reconstructed object point to be doubled, and thus to be superimposed with itself on the retina of the observer eye; this displacement is so generated for all object points of the scene. The diagrams shown form an example of a one-dimensional displacement.

A two-dimensional displacement of modulated wave fronts can be realised by designing the prisms such that they have a two-dimensionally refracting shape, or by using two identically designed prism pairs which are perpendicularly oriented.

It is within the scope of the present invention to use instead of a single controllable prism pair a matrix of regularly arranged, variably controllable prism pairs for realising the displacements.

In a third embodiment of the invention, a controllable prism is disposed centrally in a Fourier plane of an optical transformation system to be used preferably in a projection display.

Parallel oriented laser light illuminates the light modulator means SLM, as shown in FIG. 5. The following optical transformation system transforms the modulated wave fronts into the Fourier plane FE, which is at the same time the front focal plane of an optical reconstruction system. The controllable prism, which is centrally arranged in the Fourier plane FE, is operated sequentially at a high switching frequency and thus displaces the modulated wave fronts at a very fast pace. Because of the displaced wave fronts, the optical reconstruction system reconstructs each object point twice, with different speckle patterns. By way of superimposing the wave fronts on the retina of the observer eye, the eye can average different speckle patterns.

Controllable prisms as used in FIGS. 3b, 4a, 4b, and 5 are for example liquid prisms, which contain two immiscible liquids whose optical refraction behaviour can be modified by supplying a voltage.

Figure 6A:
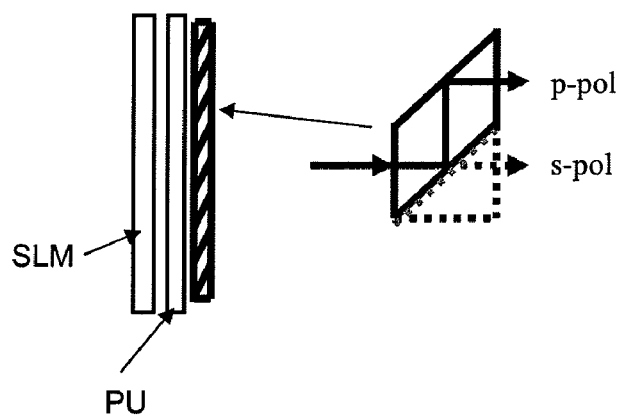
FIGS. 6a, 6b show a fourth embodiment a) with a matrix of rhombic prisms in combination with a polarisation switch and b) with a combination of two matrices of rhombic prisms and two polarisation switches.
Figure 6B:
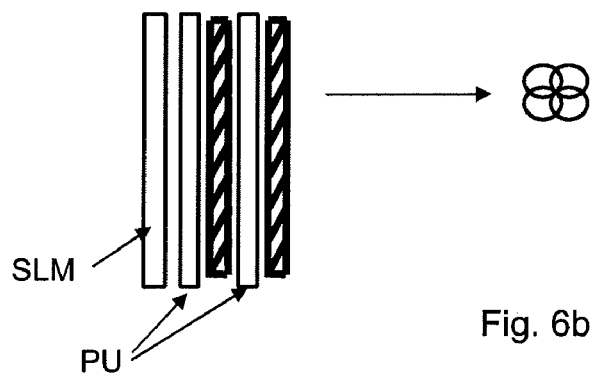

A fourth embodiment of the invention is shown in FIGS. 6a and 6b. The light modulator means SLM is combined with a matrix of rhombic prisms and an active or passive polarisation switch PU. A single rhombic prism splits each wave front into two parts which exhibit perpendicular polarisations p-pol; s-pol, as shown in detail in FIG. 6a. This single rhombic prism is one of multiple, regularly arranged prisms of the matrix, which is made clear by the arrow which points at the matrix. The polarisation switch PU, which is disposed between the light modulator means SLM and the prism matrix, can be set to a certain angle. At an angle of 45°, for example, it splits the modulated wave front into two parts of same size, whereby all reconstructed object points are displaced one-dimensionally, lateral to the original direction of propagation.

In another embodiment (not shown), the rhombic prisms can for example be switched periodically by 90° in order to displace the wave fronts sequentially in one direction and to superimpose the object points.

The combination of prism matrix and polarisation switch PU is provided twice in order to achieve a two-dimensional displacement, as shown in FIG. 6b. It must be noted that the second prism matrix, which is disposed behind the polarisation switch PU, seen in the direction of light propagation, is turned by an angle of 90°. The polarisation switch PU turns the electric field by 45°. This arrangement allows the modulated wave front to be divided sequentially into four identical parts with like brightness values, which are then superimposed on the retina.

A pattern which is achieved with this method of superimposing object points is shown in detail in FIG. 6b, which is indicated by the arrow in the drawing.

A $\lambda/2$ plate can be used as passive polarisation switch PU, and a Faraday cell can be used as active polarisation switch.

In a fifth embodiment of the invention, the displacement of object points is generally achieved by taking advantage of the birefringence effect. In a birefringent material, two optical axes are oriented depending on the direction, so that if the material is disposed in the beam path in a certain position, a pencil of rays or a wave front is split into two parts by way of refraction during its passage through the material.

Figure 7:
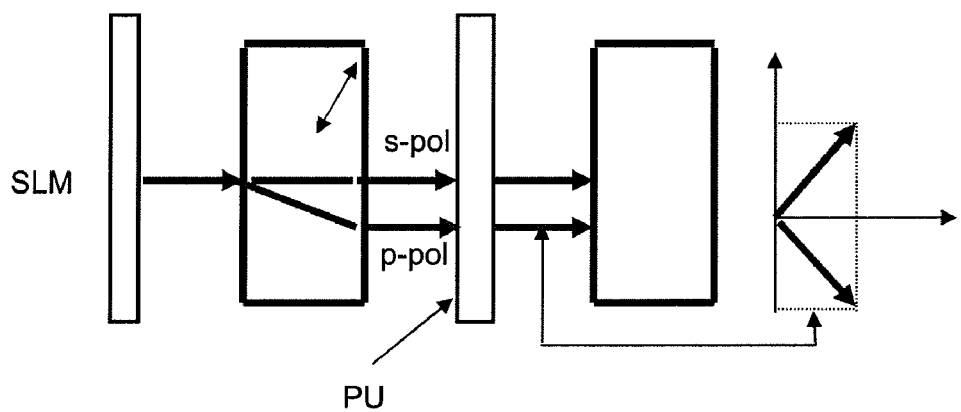
FIG. 7 shows a fifth embodiment with a two-part element made of a birefringent material in combination with a polarisation switch.

Referring to FIG. 7, the modulated wave front which comes from the light modulator means SLM thus falls on a first optical component made of a birefringent material. The orientation of the material is indicated by a double arrow. Two differently polarised wave fronts, denoted with s-pol and p-pol, exit the birefringent material in parallel. In order to displace the two wave fronts in a different direction, e.g. perpendicular to the former, a $\lambda/2$ plate or another polarisation switch PU is disposed in front of a second optical component made of a birefringent material. The $\lambda/2$ plate turns the polarisation of the two wave fronts by 45°, so that both of them enter the second material under that angle. After its passage through the second material, the wave front of an object point is displaced in four directions, and the wave fronts of this object point are accordingly superimposed four times on the retina. The four different directions are indicated in a non-perspective way by arrows in FIG. 7. Adjacent wave fronts on the retina exhibit perpendicular polarisations and do not interfere with each other, but are superimposed incoherently.

In a sixth embodiment of the invention, Bragg gratings are provided in the reconstruction beam path of an holographic display device for displacing the modulated wave fronts. They exhibit a similar behaviour as a birefringent material. By choosing a certain angle of incidence and wavelength of the laser light, the angle and wavelength of those grating structures can be chosen variably when producing the Bragg gratings by way of exposing a holographic recording medium. Thanks to these characteristics, Bragg gratings are very well suited to displacing wave fronts in a defined manner and to multiply reconstructed object points.

Figure 8:
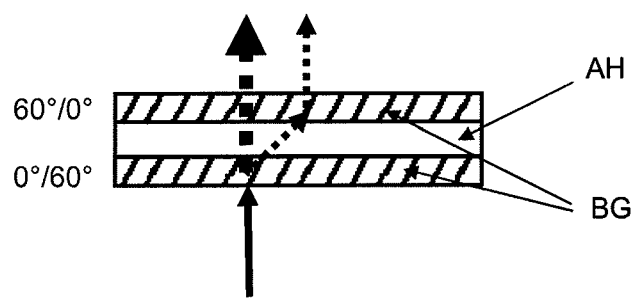
FIG. 8 shows a sixth embodiment with two Bragg gratings which are separated by a spacer.

FIG. 8 shows the general design of a Bragg grating BG with a grating geometry of 60°/0° and 0°/60°, for example, where a spacer AH is provided between the grating structures. A deflection of 60° of incident wave fronts of the laser light is realised within the Bragg grating BG with such an arrangement. The Bragg grating BG can here have a diffraction efficiency of 100% for one polarisation direction and of 0% for the perpendicular component.

The thickness of the spacer AH and the geometry of the grating (diffraction angle) determine the respective lateral displacement of an incident wave front in relation to its original direction of propagation.

With a polarisation vector of for example 45° in relation to the geometry of the grating, there will be two resultant wave fronts with like brightness values. The second grating has the same geometry as the first one, and thus diffracts only one wave front, while the other wave front passes the grating without being affected. Both wave fronts exit the second Bragg grating BG in parallel, so to realise a one-dimensional displacement.

Other combinations of optimal polarisation beam splitter geometries of Bragg gratings BG are also thinkable, for example with diffraction angles of 45°/0° or 30°/0°, or with odd angles.

The spacer AH can for example be a foil, a plastic plate or a glass plate having a thickness of up to 200 μm.

Figure 9A:
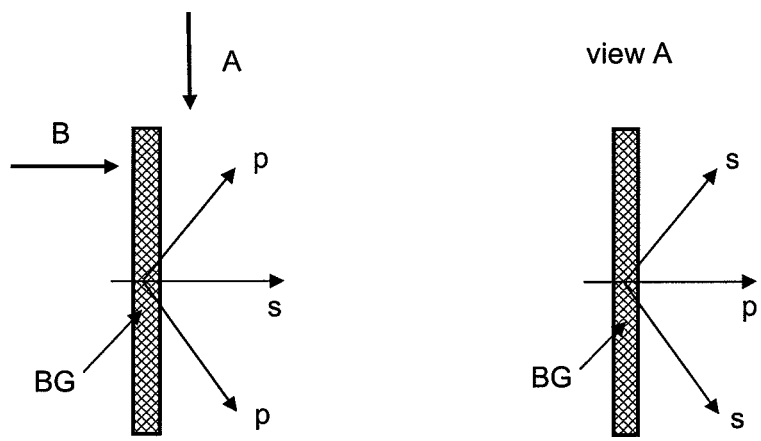
FIGS. 9a, 9b show two physical forms of the sixth embodiment with sequential combination of Bragg gratings a) as a top view and b) as a side view.
Figure 9B:
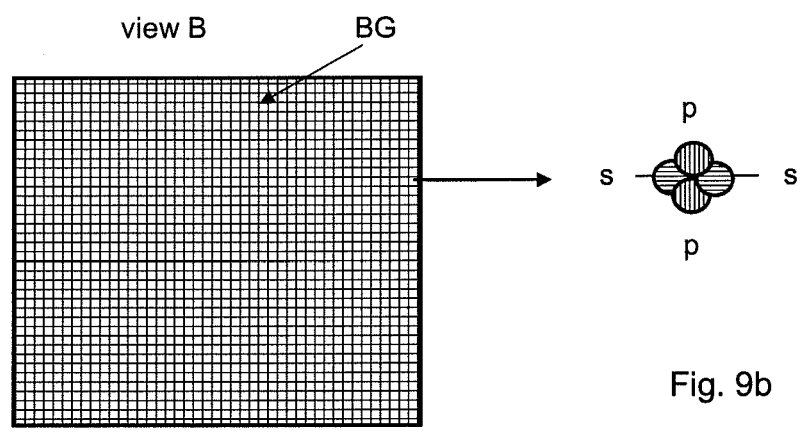

FIGS. 9a and 9b show views of a solution for a two-dimensional displacement of modulated wave fronts with Bragg gratings. Generally, the two-dimensional displacement can either be realised by a sequential combination of Bragg gratings or by writing a number of Bragg gratings to a holographic recording medium. The latter is also referred to as a volume hologram.

FIG. 9a is a side view showing a volume hologram comprising two Bragg gratings BG. The modulated laser light, which comes from the light modulator means SLM, and which comprises two polarisation components, s and p, falls on the Bragg gratings BG.

The Bragg gratings BG are chosen such that the modulated wave fronts of the polarisation component p are split into two components p during their passage. Both components p have the same polarisation, but propagate in a plane symmetrically in two directions.

A second volume hologram (not shown) also comprises two Bragg gratings. During the passage of the second volume hologram, the other polarisation component s is likewise split into two components s with identical polarisation in another plane, which is perpendicular to the former one.

Both p components and both s components (View A) of the volume holograms are shown symmetrical and mirror-inverted to the optical axis in FIG. 9a.

The two volume holograms are arranged such that the direction of propagation of the original modulated wave fronts is maintained after their passage through the two volume holograms.

FIG. 9b shows the front view of the volume hologram of FIG. 9a. The representation of the second volume hologram and spacers was omitted again in this diagram.

The Bragg gratings BG contained in the two volume holograms generate a resultant pattern of a two-dimensionally multiplied object point on the retina, which is indicated by the arrow in FIG. 9b. In the pattern, two superimposed object points always have the same polarisation s and p. Because superimposed adjacent object points are differently polarised, they will be reconstructed incoherently. An observer eye again perceives the resultant reconstruction of the scene with reduced speckle pattern here.

In a seventh embodiment of the invention, a scene, which is composed of the three primary colours RGB (red, green, blue), is reconstructed in colour using Bragg gratings. In order to realise a multiplication of the reconstructed object points for each colour, e.g. a combination of Bragg gratings with a spacer is used for each colour in the reconstruction beam path, as shown in FIG. 8.

In another physical form of the seventh embodiment, a colour reconstruction of the scene can also be realised in that a volume hologram contains a number of Bragg gratings for each colour. Generally, the number of Bragg gratings here depends on the number of desired superimpositions of the wave fronts of an object point with themselves. The larger the number of superimpositions, the finer are individual speckle patterns averaged by the observer eye.

Referring to FIGS. 9a and 9b and the related description, if a colour reconstruction of the scene is generated, a volume hologram must contain two Bragg gratings per colour and two per direction. This makes a total number of 2×2×3=12 Bragg gratings, which are required altogether to realise a colour reconstruction.

Because of the great angle sensitivity of the Bragg gratings, laser light must be emitted in a very small angular range when realising the invention. This can be achieved in that a) the means which effect the displacements are arranged behind the light modulator means, seen in the direction of light propagation, but in front of a field lens, which can for example be a Fresnel lens or a diffractive optical element DOE, or b) the means which effect the displacements are spatially divided into an adequate number of individual Bragg gratings, where the geometry of the Bragg gratings varies with the position of the modulated wave fronts.

In particular the arrangements for multiplying all reconstructed object points of the scene with themselves with the help of Bragg gratings, as used according to the invention, do not require any active components in the display device. The Bragg gratings are the most efficient means of all abovementioned means, as regards both technical and economic viability. Their great advantages are that they do not have to be moved mechanically, that they do not require any electronic control, and that they can thus be manufactured as passive elements.

The invention claimed is:

1. Holographic display device for reconstructing a scene which is divided by software means into object points, with
    system controller means for computing a computer-generated hologram (CGH) of the scene and for encoding the CGH on a light modulator means,
    a light source means for illuminating the light modulator means with coherent light, and
    a reconstruction means for transforming the light in the form of modulated wave fronts into an observer window, from where at least one observer eye sees the holographic reconstructions of the object points which are generated by the modulated wave fronts in a reconstruction space that stretches between observer window and light modulator means and which are superimposed in the observer window, wherein
    the reconstruction beam path comprises means for temporally or spatially displacing the modulated wave fronts emitted by the light modulator means of each object point which is reconstructed in the reconstruction space such that the reconstruction means multiplies each reconstructed object point with itself caused by this displacement, and that the multiplied reconstructions of each object point are incoherently superimposed with themselves in the observer window.

2. Holographic display device according to claim 1, wherein the multiplication of the reconstruction of each object point is performed at least twice, in two perpendicular directions.

3. Holographic display device according to claim 1, wherein a mirror is provided which is disposed at a given angle to an optical axis of the light modulator means, and which can be moved both laterally and along the optical axis.

4. Holographic display device according to claim 1, wherein a prism matrix is provided in a plane which is parallel to the light modulator means, where said prism matrix can be moved both along an optical axis of the light modulator means and laterally.

5. Holographic display device according to claim 1, wherein a variably controllable prism pair is provided in a plane which is parallel to the light modulator means, where the angles of refraction of the prisms sequentially vary between at least two values at a high switching frequency to realize a very fast displacement of the modulated wave fronts.

6. Holographic display device according to claim 1, wherein a matrix of controllable prism pairs is provided in a plane which is parallel to the light modulator means, where the angles of refraction are sequentially controllable variably between at least two values at a high switching frequency to realize a very fast displacement of the modulated wave fronts.

7. Holographic display device according to claim 1, which is a projection display, where a variably controllable prism is disposed centrally in a Fourier plane, which is at the same time the front focal plane of an optical reconstruction system.

8. Holographic display device according to claim 1, wherein a matrix of rhombic prisms is assigned to the light modulator means in combination with a polarisation switch or the light modulator means is followed by a first optical component made of a birefringent material in combination with a polarisation switch, after which a second optical component made of a birefringent material is disposed.

9. Holographic display device according to claim 8, where a combination of two matrices of rhombic prisms and two polarisation switches (PU) are provided for a two-dimensional displacement.

10. Holographic display device according to claim 9, wherein the polarisation switch is an active or a passive element.

11. Holographic display device according to claim 8, wherein the polarisation switch is an active or a passive element.

12. Holographic display device according to claim 1, wherein a combination of two Bragg gratings with a spacer in between is provided in the reconstruction beam path for a one-dimensional displacement of the modulated wave fronts, where each Bragg grating has a defined grating geometry.

13. Holographic display device according to claim 12, wherein the combination of Bragg gratings and spacer additionally comprises a 90° polarisation switch in order to realize a sequential two-dimensional displacement of the modulated wave fronts.

14. Holographic display device according to claim 12, wherein the Bragg gratings are combined with a 45° polariser in order to split the modulated wave front of each reconstructed object point into two perpendicular components and to displace them one-dimensionally against one another simultaneously.

15. Holographic display device according to claim 12, wherein for a two-dimensional displacement of the modulated wave fronts of the object points at least one Bragg grating is written to a volume hologram for one direction and at least one Bragg grating is written to a volume hologram for another direction.

16. Holographic display device according to claim 15, wherein two volume holograms with Bragg gratings written to them are arranged in relation to each other such that for each two-dimensionally multiplied object point a resultant pattern is generated in that always two adjacent object points are superimposed such that they exhibit perpendicular polarisations p and s, so that they can be reconstructed incoherently to each other.

17. Holographic display device according to claim 12, wherein the combination of the Bragg gratings with a spacer is provided for each colour, in order to achieve a colour reconstruction of the scene with the three primary colours.

18. Holographic display device according to claim 17, wherein the combination of the Bragg gratings with the spacer is written to a volume hologram such that the volume hologram includes always two Bragg gratings per direction and per colour, in order to achieve a colour reconstruction of the scene with the three primary colours.

* * * * *